United States Patent [19]

Castberg et al.

[11] Patent Number: 5,453,286
[45] Date of Patent: Sep. 26, 1995

[54] METHOD FOR CONVERTING MILK INTO FERMENTED MILK

[75] Inventors: Helge B. Castberg, Kolbotn; Gunnar Rysstad, Oslo, both of Norway

[73] Assignee: Elopak Systems A.G., Glattbrug, Switzerland

[21] Appl. No.: 57,450

[22] Filed: May 6, 1993

Related U.S. Application Data

[63] Continuation of Ser. No. 730,804, Sep. 12, 1991, abandoned.

[30] Foreign Application Priority Data

Feb. 9, 1989 [GB] United Kingdom ............... 8902912

[51] Int. Cl.⁶ .................................................. A23C 9/12
[52] U.S. Cl. .................... 426/43; 426/34; 426/42; 426/477; 426/522; 426/580; 426/583
[58] Field of Search ................... 426/42, 34, 39, 426/43, 330, 330.2, 330.3, 334, 580, 583, 586, 590, 474, 477, 520, 521, 522

OTHER PUBLICATIONS

Nagasaki et al., JP 63-263045, Oct. 31, 1988, abstract only.

Suzuki et al., JP 57-206333, Dec. 17, 1982, abstract only.

Singh et al., Performance of yoghurt cultures in stored raw and pasteurised milks, Cult. Dairy Prod. 19(1) 1984, pp. 24, 27, 28, 33.

*Primary Examiner*—Leslie A. Wong
*Attorney, Agent, or Firm*—Reising, Ethington, Barnard & Perry

[57] ABSTRACT

A method of convening pasteurized milk into a fermented milk comprises high-temperature heat treatment of the pasteurized milk, followed by carbonation of the heat-treated milk with $CO_2$ gas, then adding a starter culture to the carbonated milk, followed by incubation of the inoculated milk.

6 Claims, 4 Drawing Sheets

METHOD FOR CONVERTING MILK INTO FERMENTED MILK

This is a continuation of application Ser. No. 07/730,804 filed on Sep. 12, 1991, now abandoned, International application PCT/GB90/00176 filed on Jun. 2, 1990 and which designated the U.S.

BACKGROUND OF THE INVENTION

1. Field of the Invention

This invention relates to the treatment of food, in particular the treatment of dairy products with carbon dioxide.

2. Description of the Related Art

It has been known for decades to use $CO_2$ as a preservative food products.

There has recently been renewed interest in the storage of raw milk in an atmosphere of $CO_2$ (see, for example, the article "The Use of Carbon Dioxide for the Preservation of Milk" by J. S. King and L. A. Mabbitt in the Technical Series, Society for Applied Bacteriology, No.22, Preservatives in the Food, Pharmaceutical and Environmental Industries, 1987, pages 35 to 43). Lately, storage of dairy products such as yoghurt, quarg, portion-packed cheese, dessert products and dried milk in an atmosphere of $CO_2$ only or of $CO_2$ mixed with other gases has been used commercially to a certain extent. (See the article "Carbon dioxide—Its uses in the Dairy Industry" by H. G. Corinth in Deutsche Molkerei Zeitung 1982, Vol. 103, pages 942–952).

Carbonization of milk with carbonic acid or with $CO_2$ gas to extend its storage or shelf life is also known. As regards carbonation using carbonic acid, Federal German Patent 961856 is directed to solving the problem of preparing a non-setting, carbonic-acid-containing, long-life, sour milk and this is done by heating fresh milk to an ultra-high temperature of 125° C. to kill all microorganisms in the milk, adding a suitable culture as a 0.5 to 1% addition, carbonating in a sweet state by saturation at +5° C. with carbonic acid to eliminate oxygen, filling into sterilized bottles and sealing, placing the bottles into a room temperated to 20° C., and gradually raising the temperature until, after about 20 hours, so much lactic acid has been formed by the propagation of the lactic acid bacteria that the milk curdles in the bottles. With regard to carbonation using $CO_2$ gas, as an example the article "$CO_2$—Treatment of Milk for Condensation and Drying" by Thomas Eie, Gunnar Rysstad and Helge B. Castberg in Nordeuropaeisk Mejeritidsskrift No. 3–4/87, discloses that the development of the total number of bacteria, psychrotrophic bacteria, coliform bacteria, as well as moulds and yeasts was considerably inhibited in milk which had been nearly saturated with $CO_2$ (pH below 6.0), when such milk was stored at 5° and 8° C. In another example, the article "Unrefrigerated dahi can keep one month", in Indian Dairyman, Volume 21, No.9, pages 261–262, 1969, discloses that research work showed that bottled dahi of long keeping quality could be prepared by using selected strains of lactic acid bacteria. It also discloses that sweet dahi, sour dahi, acidophilus milk and yoghurt were prepared which could be stored at room temperature and at 30° C. for more than 10 days. It adds that, if the heat treated milk were carbonated prior to inoculation, the non-lactic contaminants were prevented from growing and by such treatment, dahi had been kept for more than a month without refrigeration. However, in its detailed description of the process, in which good quality milk is boiled for 3 to 5 minutes and cooled to about 30°–35° C., 1.5 to 2% of active and pure starter is added and later the milk is transferred to cleaned and sanitized milk bottles which are then tightly closed with sterile caps, the milk is carbonated (by passing $CO_2$ from a cylinder at a pressure of 60 lbs/sq inch for 1 minute) after adding of the starter.

Indian Patent 140453 discloses a process for preparing yoghurt from milk in which firstly standardization is carried out by addition of skimmed milk powder to standard milk in a pasteurizer and pasteurized at 85° to 90° C. for 30 minutes. The mixture is homogenized at a pressure of 2,500 to 3,000 lbs/sq inch and instantly cooled to 28° C. The mixture is then pumped to an inoculation tank in which 2.5 to 3% of a yoghurt culture is injected. Then the inoculated mixture is carbonated by injecting $CO_2$ gas. Following this, the carbonated mixture is incubated in the tank at 42° C. for 3 to 4 hours. Then either the incubated mix is pumped to another vessel in which it is maintained at 20° C. for 10 hours, or incubation in the inoculating tank at 42° C. is undertaken for a longer period. Then the coagulum is broken by stirring and the product is packed into containers. Alternatively, for a set type of yoghurt, inoculation occurs at the beginning of the incubation stage and the mix is packed into containers for incubation.

A major microbiological problem during storage of yoghurt is yeast and mould growth on the free surface. In an article "Einfluss der Joghurtbegasung auf das Wachstum von Schimmel und Helen" ("Effect of Gas-flushing of Yoghurt on Mould and Yeast Growth") by Drs. E. Fluckiger and F. Walser in Molkereitechnik 1973, pages 47 to 57, flushing of the headspace in the storage package with $CO_2$ has been proposed to reduce this problem.

The article "Performance of yoghurt cultures in stored raw and pasteurized milks" in Cultured Dairy Products Journal, Volume 19, No. 1, pages 24, 27, 28 and 33, 1984, discloses changes occurring when raw and pasteurized milks are stored at low temperature and then used for the preparation of yoghurt and also discloses the effects of incorporating whole milk powder to increase total solids content of milk and certain additives on growth and acid production by starter cultures. In relation to the use of pasteurized milks, laboratory pasteurized milk samples stored for varying periods (of from one to five days) at low temperature (5°–7° C.) were withdrawn and used for yoghurt making. One set of pasteurized milk samples was not subjected to any heat treatment and the other set was heated to 90° C. for 10 mins. Both sets were inoculated and then incubated at 44° C. for 4 hours. The results showed that when stored pasteurized milks were inoculated immediately without heat treatment, the starters grew poorly and produced less acid than with fresh pasteurized milk samples. However, in samples subjected to heat treatment, growth and acid production were marginally higher in stored pasteurized milks than in fresh pasteurized milks. The article also discloses the effects of incorporating additives to stored pasteurized milk with a view to avoiding re-heating. One additive employed was sodium formate, which was successful. The other additive employed was $CO_2$ gas. Stored pasteurized milk samples in flasks fitted with rubber bungs were flushed with $CO_2$ gas through the budge for varying periods up to 60 secs. After flushing, the milk samples were inoculated with a yoghurt culture and incubated at 44° C. for 4 hours, the bungs being replaced with sterile cotton wool plugs. After flushing, the initial acidity of the milk was increased up to 0.31%; whilst acid production by yoghurt cultures was also increased by $CO_2$ flushing, an acidity of 0.8% being recorded when $CO_2$ was flushed for 60 secs. The article concluded that there was increase in total acidity as well as developed acidity in $CO_2$ flushed samples, indicating that $CO_2$ atmosphere stimulated the starter activity.

Yoghurt is the coagulated milk product obtained by lactic acid fermentation through the action of *Lactobacillus bulgaricus* and *Streptococcus thermophilus*. The organisms are thermophilic and have optimum growth temperature from 40°–45° C.

A conventional process for yoghurt production comprises high-temperature heat treatment of already pasteurized milk, for a time and at temperature-giving a peroxidase negative test of the heat-treated milk. Such high-temperature heat treatment can be a batch treatment at 80°–85° C. for 20–30 minutes or a continuous, on-line treatment at 90°–95° C. for 3 minutes, cooling to an incubation temperature of 43° C., inoculation of a yoghurt starter and incubation for 4–5 hours. Alternatively, an incubation temperature of 30° C. for 12–14 hours can be used. The inoculation can take the form of introducing a starter culture into a fermentation tank through an openable cover or from a starter tank in which the culture is pre-mixed with milk.

The incubation time is critical for development of the right texture and aroma of the yoghurt. Reduction of the incubation time would be of great importance for the dairies, since it would result in less energy consumption, better utilization of incubation tanks and easier planning of production.

Commercial starter laboratories are putting a lot of research into improving the activity of their bacterial starters, both by classical selection and by genetic engineering.

SUMMARY OF THE INVENTION

An object of the invention is to shorten the incubation time during production of a fermented milk, particularly from milk which undergoes a high-temperature heat treatment, or from fresh milk which undergoes a first heat treatment, especially low pasteurization, and later a second heat treatment, especially a high-temperature heat treatment.

Another object of the invention is to improve carbonation of milk by making the carbonation more thorough.

A further object of the invention is to make the manner of carbonation of milk better adapted to high quantity production of fermented milk.

According to one aspect of the present invention, there is provided a method of converting milk into a fermented milk, comprising supplying milk, heat-treating the milk, and subsequently adding substances to the heat-treated milk, said substances comprising $CO_2$ gas to carbonate the milk and starter culture to instigate fermentation of the milk, characterized in that, between the heat-treating of the milk and the adding of said substances, the heat-treated milk is heat-treated again, said substances being added to the re-heat-treated milk.

According to a second aspect of the present invention, there is provided a method of converting milk into a fermented milk, comprising supplying pasteurized milk, and subsequently adding substances to the milk, said substances comprising $CO_2$ gas to carbonate the milk, and starter culture to instigate fermentation of the milk, characterized in that, between the supplying of the pasteurized milk and the adding of the substances, the pasteurized milk is heat-treated for a time and at temperatures giving a peroxidase negative test of the heat-treated milk, said substances being added to the heat-treated milk.

According to a third aspect of the present invention, there is provided a method of converting milk into a fermented milk, comprising supplying heat-treated milk to a fermentation tank, introducing $CO_2$ gas into the heat-treated milk to carbonate the heat-treated milk, and introducing starter culture into the milk to instigate fermentation of the milk, characterized in that the heat-treated milk is passed through a line to said tank and the $CO_2$ gas is introduced into the heat-treated milk during its passage through said line.

According to a fourth aspect of the present invention, there is provided a fermented milk produced utilizing a method according to any one of the three preceding paragraphs.

According to a fifth aspect of the present invention, there is provided apparatus for use in converting milk into a fermented milk, comprising first introducing means for introducing $CO_2$ gas into heat-treated milk to carbonate the heat-treated milk, a fermentation tank, and second introducing means for introducing starter culture into the milk to instigate fermentation of the milk, characterized in that a line extends from said first introducing means to said fermentation tank for conducting the carbonated milk to said tank.

By "fermented milk" we mean a liquid product derived from milk (whether modified or unmodified) by a method in which a bacterial culture is added to the milk and ferments the milk to a consumable product.

The fermented milk may be selected from among butter milk, sour cream, yoghurt and acidophilus milk.

An advantage of the present invention is that it can shorten the fermentation time necessary and can thus lead to economies in the manufacture of the fermented milk, without any significant deterioration in the organoleptic properties of the fermented milk.

It is particularly applicable to yoghurt production, in which the introduction of the carbon dioxide in the milk and its continued presence therein improves the milk as a medium for the yoghurt starter.

We have found that the presence of the carbon dioxide in the milk stimulates the growth of the yoghurt bacteria. This is probably a combined effect of removal of oxygen from the milk and thus lowering of the redox potential, and a direct stimulation of the yoghurt bacteria by the carbon dioxide.

Dutch Scientists, F. M. Driessen, F. Kingma and J. Stadhouders, at a Symposium on lactic acid bacteria in foods—genetics, metabolism and applications, at Wageningen, Holland, in 1983 reported rapid *B.cereus* growth during the initial lag phase of yoghurt incubation at 30° C. High $O_2$-content retards the growth of yoghurt bacteria and stimulates the *B.cereus*. The present $CO_2$ treatment of the milk might completely inhibit the *B.cereus* cells.

We believe that the presence of $CO_2$ in the yoghurt, preferably combined with a gas tight package, might be a good alternative to the known flushing of the package headspace with $CO_2$ gas.

The feature that the milk is carbonated before it is inoculated makes the present method practical for application to on-line carbonation of the milk, which, compared with the known in-tank carbonation, improves the evenness of the degree of carbonation throughout the milk and also improves the speed of production of fully carbonated milk, particularly since the length of line extending downstream from the location of introduction of the $CO_2$ gas can be made sufficiently great that a very thorough mixture and thus carbonation can be obtained. That length is such that the time period for the carbonation milk to reach the fermentation tank is at least ten seconds, preferably at least thirty seconds. In practice, the length is at least ten metres, preferably at least thirty metres.

In a preferred method, yoghurt is processed from pasteurized milk saturated with $CO_2$ at a concentration of about 1200 ppm. We have found that this use of $CO_2$ stimulates the growth of the yoghurt starter which results in a reduced incubation time of about 20%; production of the main aroma compound in yoghurt; acetaldehyde, is increased; the finished product obtains a pleasant, effervescent taste; growth of spoilage and pathogenic micro-organisms is suppressed and the shelf life of the produce is increased.

BRIEF DESCRIPTION OF THE DRAWINGS

In order that the present invention may be clearly understood and readily carried into effect, examples thereof will now be described with reference to the accompanying drawings, in which.

DESCRIPTION OF THE PREFERRED EMBODIMENTS

EXAMPLE I

Milk Treatment

This example describes a laboratory experiment providing small scale production of yoghurt from pasteurized, whole cow's milk.

Pasteurized, whole cow's milk was fortified with dried skim milk powder to increase total solids to 2.5% (according to Norwegian legislation for yoghurt production).

The milk was tempered to 60° C., homogenized at 180kp/cm² and heat treated at 90° C. for 35 seconds in a plate heat exchanger. At outlet the temperature of the milk was 12° C.

The milk was split into two containers, each containing 30 litres of the heat-treated milk. $CO_2$ gas was sparged into the milk at 12° C. through gas distribution nozzles in the bottom of one of the two containers. After this carbonation, the concentration of $CO_2$ in the milk was 1288 ppm (measured by Beckman Infrared Analyzer). Concentration of $CO_2$ in the control milk (not $CO_2$ - treated) was 30 ppm.

The $CO_2$- treated and control milks were temperated to 42° C., which is a preferred incubation temperature for yoghurt production. Both milks were inoculated with 2% of a commercial yoghurt starter B3 from Chr.Hansen's Laboratories A/S of Bogs Alle 10–12, P.O. Box 407, 2970 Hotsholm, Denmark.

The inoculated $CO_2$-treated milk and the inoculated control milk without $CO_2$ were filled into 1 litre glass containers and incubated at 42° C. for 5 hours. The containers were closed with aluminium foil, and therefore not airtight during fermentation.

Samples were withdrawn every hour for analyses of:

content of $CO_2$ total viable count pH volatile aroma compounds balance between rods (Lactobacillus) and cocci (Streptococcus)

Observations During Incubation

Content of $CO_2$

The $CO_2$- treated milk originally contained 1288 ppm $CO_2$. The raising of the temperature from 12° C. to 42° C. caused this content to decrease to 1033 ppm.

Figure 1:
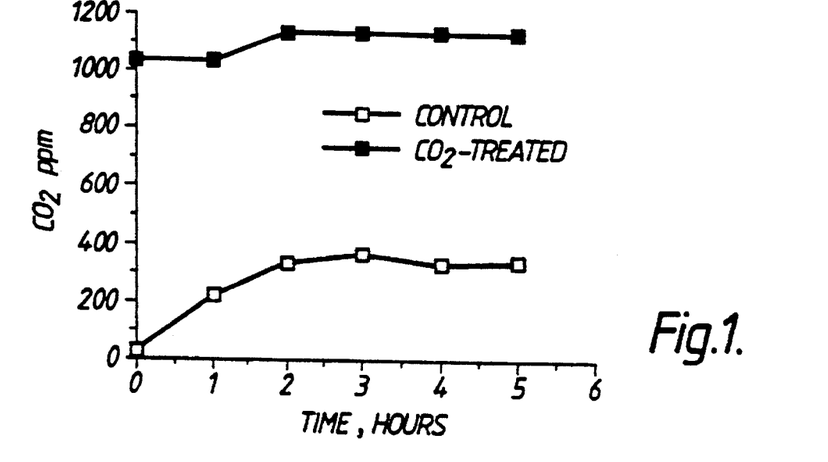
FIG. 1 shows a graph of $CO_2$ concentration against time for $CO_2$-treated and control milks in small scale production of yoghurt.

Results from $CO_2$- measurements in the milks during fermentation are shown in FIG. 1 of the accompanying drawings.

The apparent less production of $CO_2$ in the $CO_2$- treated milk compared to the control milk during fermentation probably reflects oversaturation and evaporation of $CO_2$ in the $CO_2$- treated milk.

Total Viable Count

Figure 2:
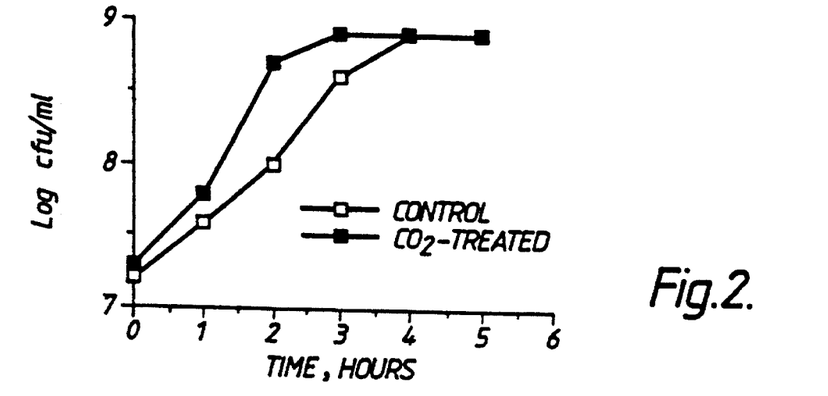
FIG. 2 shows a graph of total bacterial count concentration against time for those milks.

Stimulation of yoghurt bacteria by $CO_2$ was shown by measuring the growth of bacteria through incubation. FIG. 2 shows the total counts of bacteria in the $CO_2$- treated milk and the control milk.

These two parameters clearly show the stimulatory effect of $CO_2$. Incubation time in this example could be reduced from 5 to 4 hours when the milk is treated with $CO_2$.

pH

Figure 3:
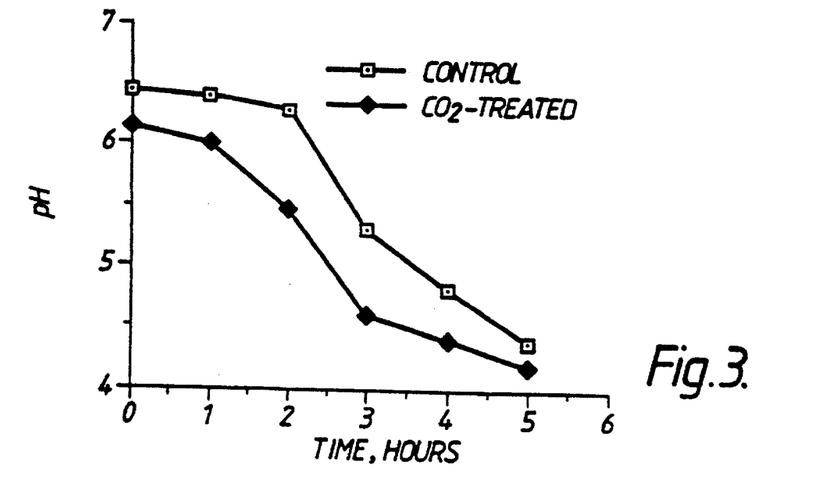
FIG. 3 shows a graph of pH against time for those milks.

Development of pH in the two milks is presented in FIG. 3.

The continually greater degree of acidity after given times with the $CO_2$-treated milk compared with the control milk again demonstrates stimulation of yoghurt bacteria by the $CO_2$.

Volatile Aroma Compounds

Figure 4:
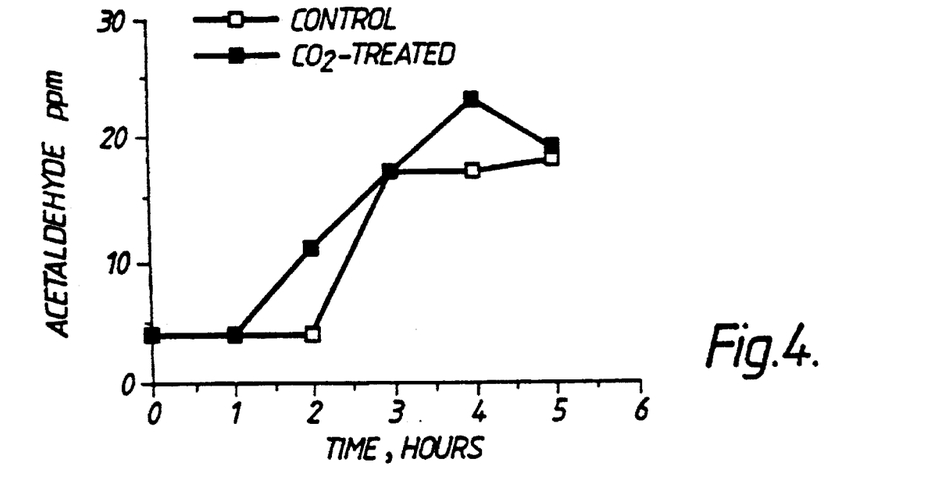
FIG. 4 shows a graph of acetaldehyde concentration against time for those milks.

Acetaldehyde is the main volatile aroma compound produced in yoghurt, and high production of this compound is crucial to give the product its characteristic flavour. The production of acetaldehyde in the $CO_2$- treated milk and the control milk is shown in FIG. 4 (analysed by gas chromatography).

The results reveal more rapid and higher maximum production of acetaldehyde in the $CO_2$- treated milk compared with the control milk.

Balance Between Rods and Cocci

Figure 5:
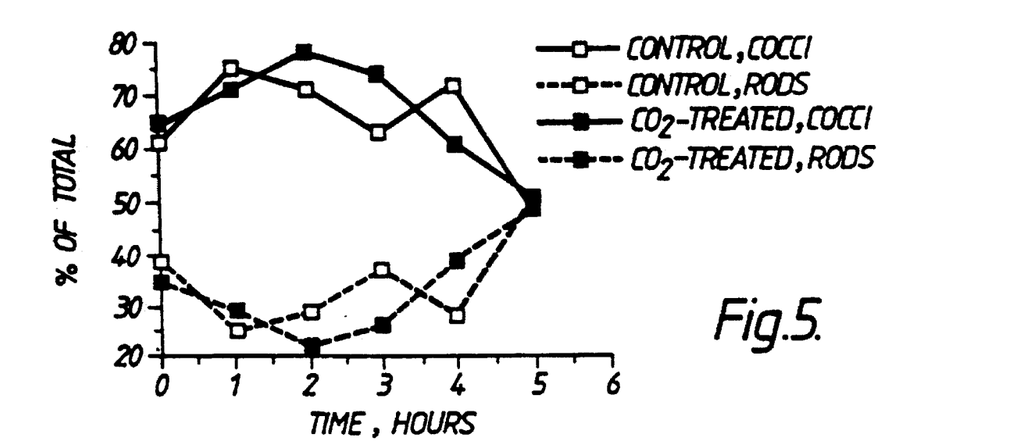
FIG. 5 shows a graph of cocci percentage and rods percentage of total bacterial count against time for those milks.

The balance between cocci and rods is an important quality parameter for yoghurt. Too low a level of cocci will lead to insufficient aroma production, while too high a level of rods will give increased production of D(−) lactic acid which is undesirable for nutritional reasons. Results are presented in FIG. 5, demonstrating that the $CO_2$- treatment of milk for yoghurt production does not alter the balance between cocci and rods compared to the control milk. In both milks an optimal ratio is obtained.

EXAMPLE II

The quality of the $CO_2$- treated yoghurt and the control yoghurt produced as described in Example I was assessed during a storage time of 2 months.

Samples were taken after 1 day, 1 week, 2 weeks, 3 weeks and 2 months for analyses of:

sensory evaluation pH total viable count volatile aroma compounds firmness and viscosity Both the $CO_2$- treated yoghurt and the control yoghurt got high scores in the sensory evaluation. The $CO_2$- treated yoghurt however, was more fresh and effervescent than the control.

The viscosity was slightly higher in the $CO_2$- yoghurt than in the control. Yeast and mould were not detected in any of the samples ($CO_2$- treated or control).

For full scale production of yoghurt, alteration of the process described above in the laboratory experiment is required. The greater the proportion of the process which is continuous, on-line the better, because the greater the savings in cost and time.

EXAMPLE III

The present example describes full scale production of yoghurt with a method for introduction of the $CO_2$ continuously and with a control in which $CO_2$ is not introduced.

Figure 6:
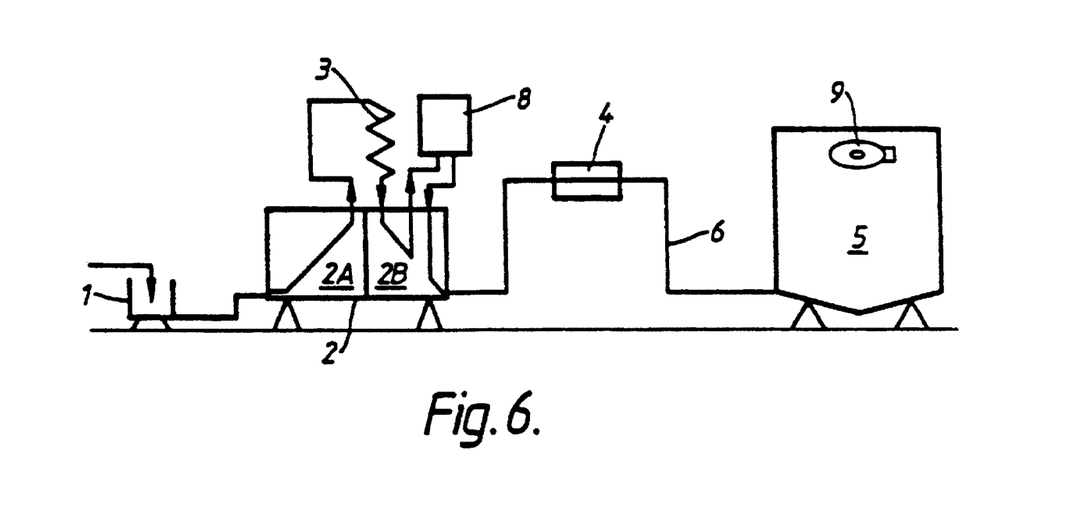
FIG. 6 shows diagrammatically a system for full-scale production of yoghurt.
Figure 7:
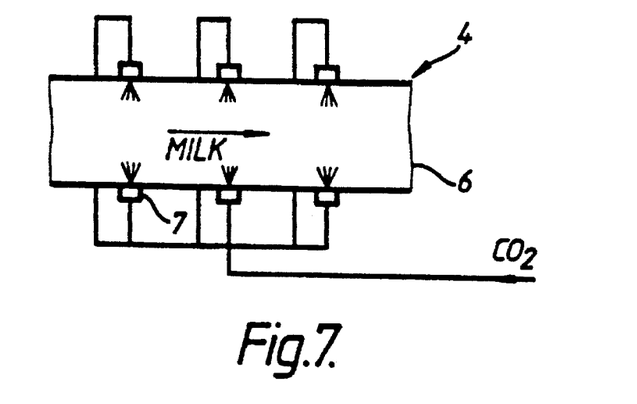
FIG. 7 shows diagrammatically and in more detail a $CO_2$-infusion section of the system.

FIG. 6 illustrates a system for such full-scale production, FIG. 7 illustrating a $CO_2$- infusion section of the system.

Milk Pretreatment

Pasteurized whole milk was fortified with 3% non-fat dry milk, heated to 88° C. and vacuum deaerated, its temperature decreasing to 80° C. The milk was then forwarded to a balance tank 1 and fed to a heater section 2A of a plate heat exchanger 2, and a holding cell 3 wherein heat treatment was at 95° C. for 6 minutes, and the milk was then cooled to 42° C. in a cooling section 2B of the exchanger 2, with an interval during which the milk was homogenized at 85° C. in a two-step homogenizer 8 at 200 kp/cm$^2$ $CO_2$ Inclusion After temperation to 42° C., the milk was transported in a closed pipeline 6 to stainless steel fermentation tanks 5 each of a capacity of 4000 litres.

$CO_2$ was sparged into the milk at a $CO_2$ infusion section 4 in the pipeline 6 through stainless steel nozzles 7. The diameter of the pipeline 6 was 2.5 inches, and milk passed through at a rate of 7500 litres/hour.

After $CO_2$- sparging, the milk was transported through 50 m. of the pipeline 6 before passing into the fermentation tank. During this transport, owing to the length of pipeline between the section 4 and each tank 5, good distribution of the $CO_2$ gas in the milk is facilitated.

Inoculation and Incubation 2500 litres of $CO_2$- treated milk and 2500 litres of control milk were transferred to respective fermentation tanks 5.

0.5 kg DVS culture, (Chr.Hansen's 180) was added to each tank by way of an openable cover 9 and the milk agitated for 5 minutes for good distribution of culture bacteria.

Samples were withdrawn for analyses every 0.5 hours during the fermentation. $CO_2$- content in the $CO_2$- treated milk was 1800 ppm immediately after agitation.

Figure 8:
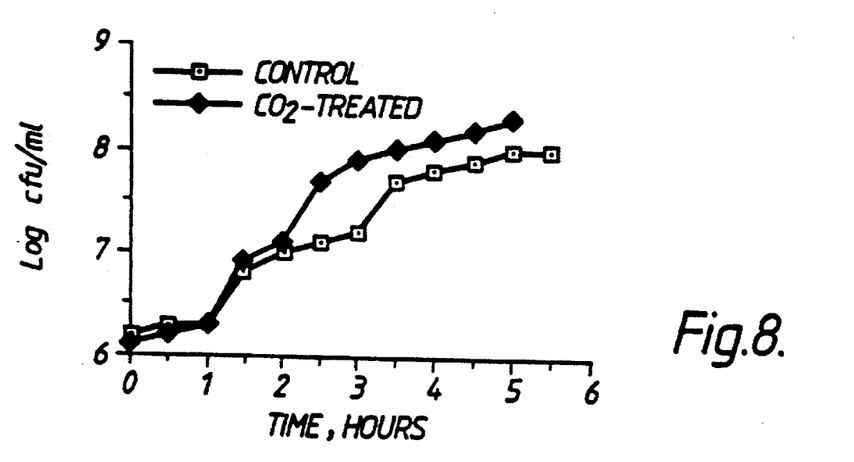
FIG. 8 shows a graph of total bacterial count concentration against time for $CO_2$-treated and control milks in the full-scale production.
Figure 9:
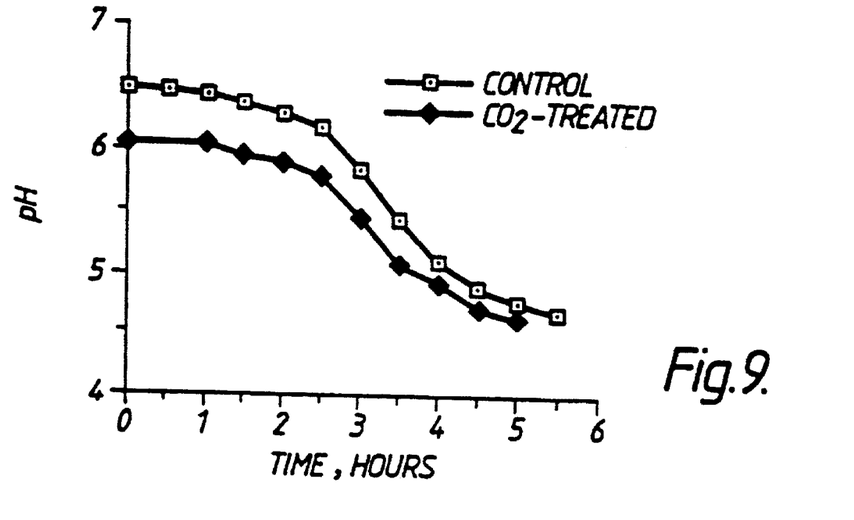
FIG. 9 shows a graph of pH against time for the latter milks.

The results of bacterial count and pH sampling are shown in FIG. 8 and FIG. 9, respectively.

EXAMPLE IV

This example shows the effect of $CO_2$- treatment of milk prior to fermentation with culture of selected intestinal type bacteria, to produce acidophilus milk.

Culture

The culture used in this experiment was AB—culture, again from Chr.Hansen's Laboratories A/S. The culture consists of two highly concentrated bacteria, *Lactcbacillus acidophilus* and *Bifidobacterium bifidum*. Both organisms are selected intestinal type bacteria, and they are shown to have a beneficial effect on human nutrition and health.

Milk Treatment

Pasteurized whole cow's milk was homogenized at 200 kp/cm$^2$ and heat treated at 95° C. for 5 minutes. The milk was temperated to 37° C. and $CO_2$ gas was sparged through a batch of the milk as described for the laboratory experiment of Example I above, a control batch of the not being carbonated.

Incubation

The $CO_2$- treated milk and the control milk were inoculated with concentrated AB culture, distributed into 500 ml glass containers and incubated at 37° C. Samples were withdrawn every 2 hours for bacteriological analyses.

Results

Figure 10:
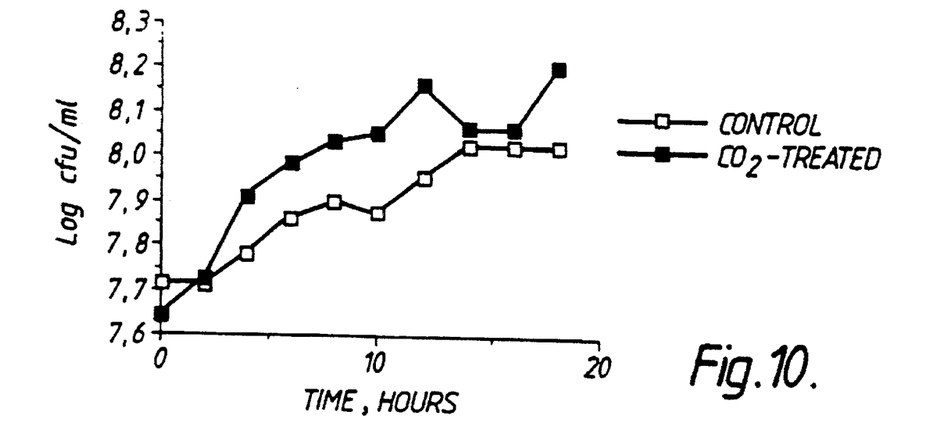
FIG. 10 shows a graph of total bacterial count concentration against time for $CO_2$-treated and control milks in small scale production of acidophilus milk.

The results from the bacteriological investigations indicated better bacterial growth in the $CO_2$- treated milk compared with the control milk, as shown in FIG. 10, which plots total bacterial count against time.

Figure 11:
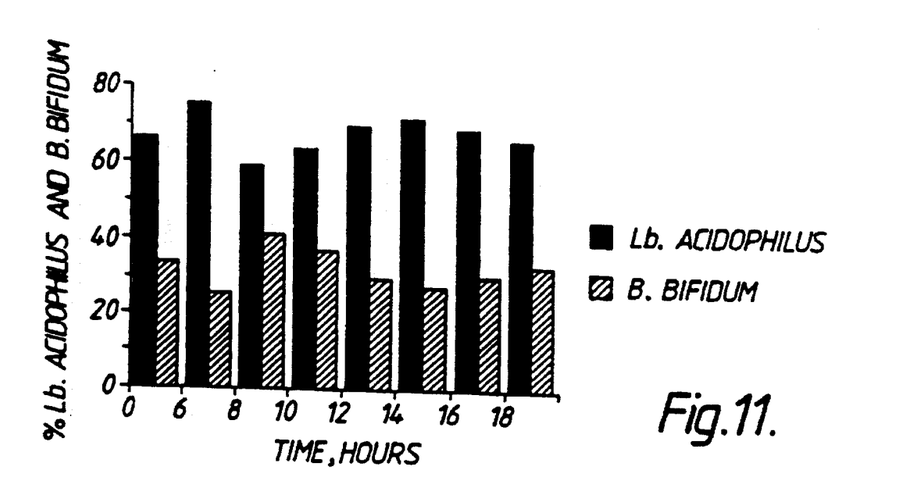
FIG. 11 shows a graph of percentage of Lb.acidophilus and B.bifidum against time for the latter $CO_2$-treated milk.
Figure 12:
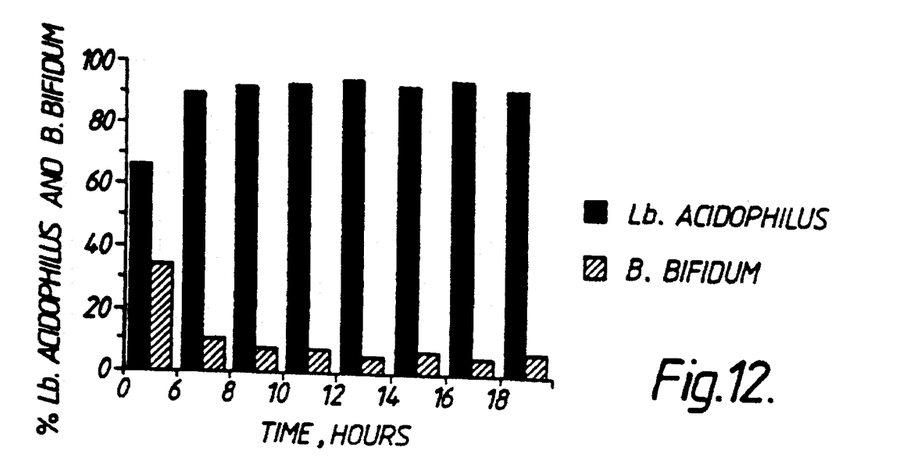
FIG. 12 shows a graph of percentages of Lb.acidophilus and B.bifidum against time for the latter control milk.

In addition, a higher number of *B.bifidum* was observed in the $CO_2$-treated milk, and an optimal ratio of 34% *B.bifidum* and 66% *Lb.acidophilus* was detected therein, as illustrated in FIG. 11, showing the balance between these two kinds of bacteria at given times during the fermentation of the $CO_2$-treated milk. However, growth of *B.bifidum* appeared to be too low in the control milk, as illustrated in FIG. 12, showing the balance between these two kinds of bacteria at given times during the fermentation of the control milk.

We claim:

1. A method of converting milk into a fermented milk, comprising supplying pasteurized milk, and subsequently adding substances to the milk, said substances comprising $CO_2$ gas to carbonate the milk, and starter culture to instigate fermentation of the milk, characterized in that, between the supplying of the pasteurized milk and the adding of the substances, the pasteurized milk is heat-treated for a time and at temperatures giving a peroxidase negative test of the heat-treated milk, said substances being added to the heat-treated milk.

2. A method according to claim 1, wherein the adding of the $CO_2$ gas precedes the adding of the culture.

3. A method according to claim 1 or 2, and further comprising cooling the heat-treated milk prior to the carbonating of the same.

4. A method according to claim 1, wherein the heat-treated milk is passed through a line (6) to a fermentation tank (5), and the $CO_2$ gas is introduced into the heat-treated milk during its passage through said line (6).

5. A method according to claim 4, wherein, after the introduction of the $CO_2$ gas, the carbonated milk takes a time period of at least ten seconds to flow through said line (6) to said tank (5).

6. A method according to claim 5, wherein said time period is at least thirty seconds.

* * * * *

UNITED STATES PATENT AND TRADEMARK OFFICE
CERTIFICATE OF CORRECTION

PATENT NO. : 5,453,286
DATED : September 26, 1995
INVENTOR(S) : Helge B. Castberg It is certified that error appears in the above-indentified patent and that said Letters Patent is hereby corrected as shown below:

Col. 1, line 31, delete "Carbonization" and insert therefor -- Carbonation --.

Col. 2, line 59, delete "budge" and insert therefor -- bungs --.

Col. 8, line 31, after "of the" insert -- milk --.

Signed and Sealed this

Twentieth Day of August, 1996

Attest:

BRUCE LEHMAN

Attesting Officer        Commissioner of Patents and Trademarks